_US005748936A_

United States Patent [19]
Karp et al.

[11] Patent Number: 5,748,936
[45] Date of Patent: May 5, 1998

[54] METHOD AND SYSTEM FOR SUPPORTING SPECULATIVE EXECUTION USING A SPECULATIVE LOOK-ASIDE TABLE

[75] Inventors: Alan H. Karp, Palo Alto; Rajendra Kumar, Sunnyvale, both of Calif.

[73] Assignee: Hewlett-Packard Company, Palo Alto, Calif.

[21] Appl. No.: 655,655

[22] Filed: May 30, 1996

[51] Int. Cl.$^6$ .................................................. G06F 15/16
[52] U.S. Cl. .............. 395/394; 395/800.23; 395/800.24; 395/591
[58] Field of Search .................. 395/800.23, 800.24, 395/394, 391, 586, 706, 591

[56] References Cited

U.S. PATENT DOCUMENTS

| 5,276,819 | 1/1994 | Rau et al. | 395/421.04 |
|---|---|---|---|
| 5,634,023 | 5/1997 | Adler et al. | 395/591 |
| 5,659,722 | 8/1997 | Blaner et al. | 395/581 |

OTHER PUBLICATIONS

"Some Design Ideas for a VLIW Architecture for Sequential-Natured Software", by K. Ebcioglu, Part 1: Parallel Architectures, *Parallel Processing*, Proceedings of the IFIP WG 10.3 Working Conference on Parallel Processing, Pisa, Italy, 25–27 Apr. 1988, pp. 3–21.

IBM Research Report, "Some Global Compiler Optimizations and Architectural Features for Improving Performance of Superscalars", by K. Ebcioglu and R. Groves, pp. 1–13.

"Sentinel Scheduling: A Model for Compiler–Controlled Speculative Execution", by S.A. Mahlke, W.Y. Chen, R.A. Bringmann, R.E. Hank, W.W. Hwu, B. Ramakrishna Rau and M.S. Schlansker, ACM Transactions on Computer Systems, Nov. 1993, pp. 1–47.

"Sentinel Scheduling for VLIW and Superscalar Processors", by S.A. Mahlke, W.Y. Chen, W.W. Hwu, B. Ramakrishna Rau and M.S. Schlansker.

Moudgill et al. "Register Renaming a Dynamic Speculation: An Alternative Approach" IEEE, 1993.

Pneumatikatos et al. "Guarded Execution oBranch Prediction in Dynamic ILP Processors" IEEE, 1994.

Mahlke et al. "Characterizing Impact of Predicated Execution on Branch Prediction" Dec. 1994.

Lin; "Compiler Support for Predicated Execution in Super-Scalar Processors" Sep. 1990.

Comte et al. "Using Branch Handing Hardware to Support Profile–Driven Optimization".

*Primary Examiner*—Larry D. Donaghue

[57] ABSTRACT

To support speculative execution in a processor, a speculative look aside table stores information about deferred exceptions. Labels attached to predicates in the predicate register file of the processor serve as indices to a speculative look aside table. When an exception is generated for a speculative operation, the speculative look aside table is updated. Deferred exceptions are detected and handled when the processor reads the corresponding entry in the speculative look aside table during an explicit or implicit check operation.

20 Claims, 5 Drawing Sheets

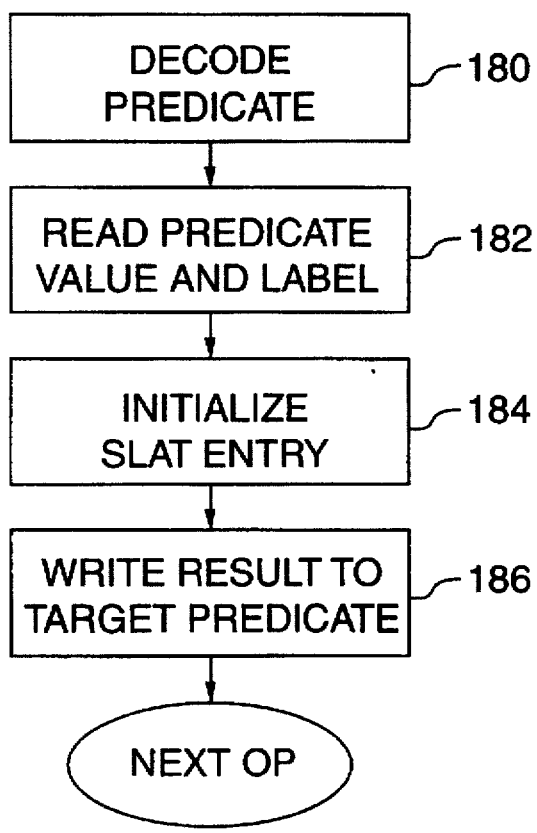
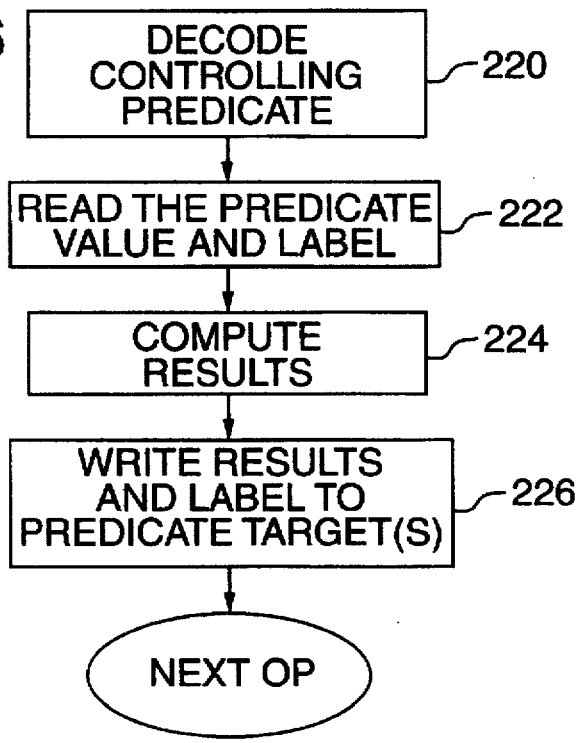

1

METHOD AND SYSTEM FOR SUPPORTING SPECULATIVE EXECUTION USING A SPECULATIVE LOOK-ASIDE TABLE

TECHNICAL FIELD

The invention relates to instruction level parallelism in a processor, and more specifically relates to an improved technique for speculative execution.

BACKGROUND OF THE INVENTION

In the field of computer processor design, developers are always looking for ways to increase the rate at which the processor executes instructions. To accomplish this goal, the processor can be designed to execute several operations at once, or the cycle time of the processor can be reduced. One type of processor, referred to as a superscalar processor, includes special hardware to identify operations in the instruction stream that can be executed simultaneously. Unfortunately, the complexity of this hardware makes it difficult to reduce the cycle time.

Another type of processor, referred to as superparallel or Very Long Instruction Word (VLIW), relies on the compiler to schedule operations in bundles that can be executed in parallel. Since the hardware is simpler than in superscalar processors, the cycle time can be reduced further.

One problem with VLIW processors, however, is that there often are not enough independent operations to keep the hardware resources busy. The phrase commonly used to refer to the extent to which operations can be executed in parallel is "Instruction Level Parallelism." Programs executed on VLIW processors are typically optimized to improve instruction level parallelism. This optimization can be performed in the compiler, in the hardware, by hand, or using some combination of these techniques.

Speculative code motion is a form of optimization that can improve instruction level parallelism. In general, it involves moving an operation across a conditional branch that controls its execution. In speculative code motion, one or more operations are moved from their home basic block to a previous basic block in the program. A "basic block" is a straight line sequence of operations followed by a branch. The home block is the basic block in which the speculative operation originally resides in the program. The previous basic blocks for a given basic block include all the basic blocks that can branch to the given basic block or that sequentially precede the basic block.

An operation moved in this manner is referred to as "speculative" or "anticipatory" because it is executed before it is known whether the operation will be used in the program. The result of a speculative operation may never be used because a conditional branch that leads to the home block of the operation may take a different path.

While speculative code motion can improve the performance of VLIW processors, a problem can arise when a speculative operation generates a fault. Consider, for example the following source code:

if (A!=0) B=*A

A non-speculative version of this code would be:

```
... (some code here)
    branch to instruction X if register A holds a 0
``` load register B from the address in register A
X: ...

The speculative version of this code would be:

```
load register C speculatively from the address in
register A
... (some code here)
    branch to instruction X if register A holds a 0
    copy the contents of register C to register B
X: ...
```

In this example, the speculative code motion improves the instruction level parallelism, and has the additional benefit of reducing the impact of the latency incurred in the load operation. However, a speculative operation may generate a fault even if the result of the operation is never used in the program. For instance in this example, the speculative load operation may generate a fault when register A holds a zero. If a speculative operation generates a fault, it should not be reported or processed immediately. Instead, processing of the fault should be deferred until it is known that the result of the operation will actually be used in the program. This point is sometimes referred to as the commit point, the point where use of the operation can cause a change in state of the computer.

There are a number of possible approaches to deal with exceptions generated during speculative execution. One conservative approach is referred to as "safe speculation." In this approach, only operations that do not generate exceptions are moved speculatively. This approach does not improve instruction level parallelism sufficiently because it precludes speculative motion of many operations. Moreover, it does not allow load operations to be executed speculatively, and therefore, does not have the benefit of hiding memory latency.

Another alternative approach is referred to as boosting. In this approach, a speculative operation is tagged with the path back to its home basic block. To defer an exception, this state information must be saved until the processor takes a different execution path or it uses the result of the operation in a non-speculative operation.

The need to save this state information is a drawback of the boosting technique. Additional memory is required to store this state information. This gives rise to a trade off between the extent to which boosting can be achieved and the additional op code bits required to store the branch directions. The number of branches that an operation can be moved across is limited by the memory available to store the state information.

Another approach involves the use of a poison bit to defer exceptions. In this approach, the processor marks the result register of a speculative operation with a poison bit when an exception has been generated. When another speculative operation uses the result of this operation, the processor can propagate the exception by setting a poison bit in the result register of the operation. Processing of the exception is deferred until a non-speculative operation consumes the poison bit. At that point, the processor can report or process the exception.

The poison bit approach typically requires that an extra bit be added to the op code of speculative operations in the instruction set architecture to differentiate between speculative and non-speculative operations. This is a drawback because it increases the complexity of the instruction set and requires additional memory in the register file. In addition, the poison bit must be saved when a register is spilled at a function call or context switch. It is difficult to save the poison bit because a register that holds 64 bits of data, for example, needs to be spilled to 65 bits of memory.

Yet another approach is referred to as tagging. In this approach, each operation has a tag associated with it. Typically, a tag of zero indicates that the operation is non-speculative. For speculative operations, the tag refers to memory in the processor such as a tag table that stores information about deferred exceptions. In this scheme, a commit operation is inserted at the home block of an operation to check for a deferred exception.

One problem with the tagging approach is that the amount of speculation is typically limited by the number of op codes available for tags. When more bits are needed to encode the tags, fewer bits are available to enhance the repertoire of operations in the instruction set architecture. Another problem is the need to explicitly clear the information stored in the tag when the branch direction skips the commit operation.

In light of the drawbacks to the above approaches to speculative execution there is a need for an improved method and hardware support for speculative execution.

Among the drawbacks highlighted above, one of the common drawbacks is the need for extra op code bits to support speculative execution. None of the approaches known to us uses the predicate file to support speculative execution. The use of predicates is a well known technique for removing conditional branches from a program. A predicate is typically comprised of a single bit that controls whether the processor should execute the operation associated with it.

In a program that uses predicates, conditional branches are replaced by predicates, which serve as guards to operations. Instead of a conditional branch, the value of the predicate bit controls whether an operation will execute. In effect, the predicate "replaces" the conditional branch. The expression or expressions that comprise the conditional branch control the value of the predicate bit.

SUMMARY OF THE INVENTION

The invention provides a method and hardware logic for supporting speculative execution using a speculative look aside table. In one embodiment, labels, which serve as indices into a speculative look aside table, are attached to the predicates in a predicate file. The corresponding entries in the speculative look aside table store information about deferred exceptions. For instance, when an exception is generated for a speculative operation, the corresponding entry in the speculative look aside table is updated with information about the deferred exception. This information can include a single poison bit indicating that exception has occurred as well as additional data about an exception.

An operation in the home basic block of the speculative operation or the speculative chain of operations can be used to check for a deferred exception. This operation can be an explicit check operation or an implicit check operation implemented as part of a non-speculative operation. During this check operation, the label for a speculative operation or chain of operations is decoded, and the corresponding entry in the speculative look aside is checked to determine whether an exception has been deferred. If one has been deferred, the exception is either reported or a recovery process is invoked for recoverable exceptions.

In one specific implementation, the predicate includes a one bit value that controls execution of an operation, and an n-bit label that serves as an index to the speculative look aside table. The value of the label also specifies whether the operation is speculative. To support speculative execution, two additional operations can be scheduled for a chain of speculative operations: a label predicate operation to attach a label to a predicate, and a check operation to check whether an exception has been deferred. When a predicate is a target of an operation, the value of the target predicate is defined by the result of the operation, and the target predicate receives the label of the qualifying predicate.

When an exception is generated for a speculative operation in this implementation, a poison bit in the corresponding entry of the speculative look aside table is set. If the execution of the code leads to the home block of the speculative operation that generated the exception, then a check operation is executed which reads the corresponding entry in the speculative look aside table. If the poison bit is set, the exception is handled at that time. In this implementation, the processing of the exception is deferred by attaching a label to the associated predicate and storing information about a deferred exception in a corresponding entry in a speculative look aside table.

The approach summarized here has a number of advantages. One advantage to this approach is that no op code bits or additional bits in the general purpose or floating point registers are necessary to support speculative execution. Another advantage is that it can support more than one chain of speculative operations at a time. More operations can be executed speculatively using this approach. In addition, it can support recovery from deferred exceptions without code size explosion.

Further advantages and features will become apparent with reference to the following detailed description and accompanying drawings.

BRIEF DESCRIPTION OF THE DRAWINGS

FIG. 4 is a flow diagram illustrating the steps executed by the processor to perform a label predicate operation in an embodiment of the invention.

FIG. 6 is a flow diagram illustrating how knowledge of a deferred exception can be propagated in an embodiment of the invention.

DETAILED DESCRIPTION

Figure 1:
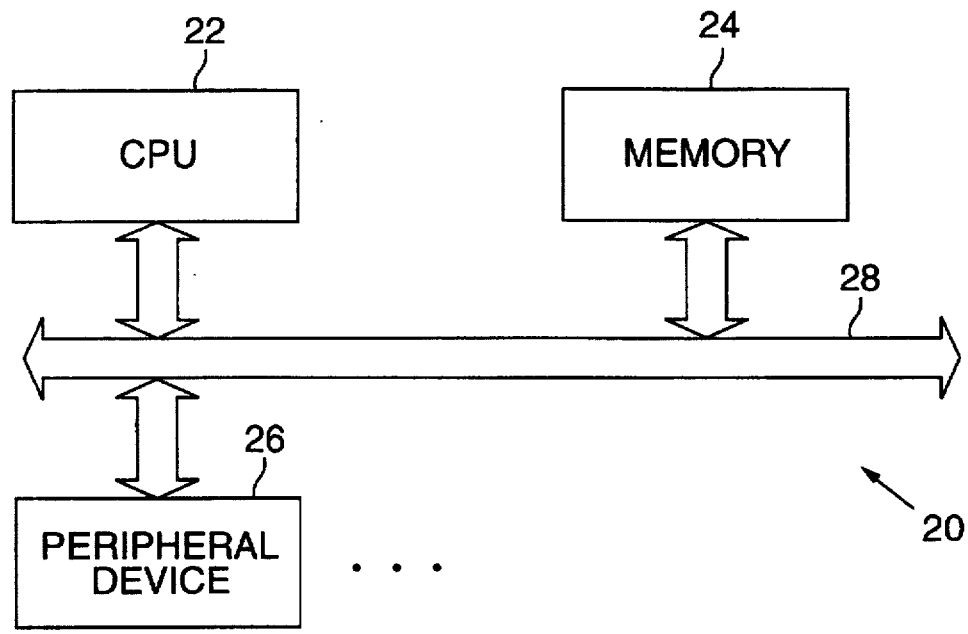
FIG. 1 is an overview diagram of computer system in which the invention can be implemented.

As an overview, FIG. 1 illustrates a generalized block diagram of a computer system 20 in which an embodiment of the invention may be implemented. The computer system 20 includes a CPU 22 coupled to memory 24 and one or more peripheral devices 26 via a system bus 28. The system bus 28 carries data and control signals to the CPU 22, memory 24 and peripheral devices 26. The memory 24 preferably includes Random Access Memory (RAM), but may also be implemented with Read Only Memory (ROM), or a combination of RAM and ROM. The memory 24 stores data for one or more programs that may be executed in the computer system 20.

Figure 2:
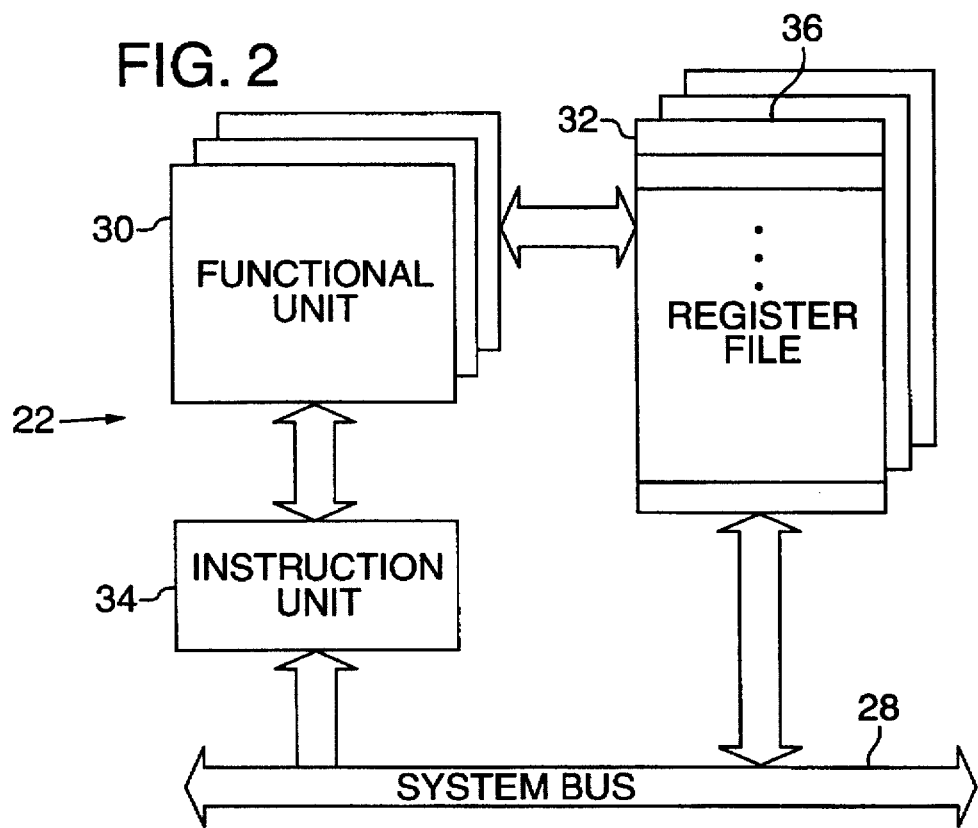
FIG. 2 is a general block diagram of a processor in which the invention can be implemented.

FIG. 2 is a general block diagram of a processor 22 in an embodiment of the invention. The processor 22 includes multiple functional units 30, one or more register files 32, and an instruction unit 34. The register files 32 typically contain several general purpose registers 36 for storing values, addresses and possibly other data. The term "general purpose registers" can include floating point, fixed point, and predicate registers, to name a few.

The architecture of the processor 22 may vary. This particular architecture merely depicts the high level hardware design of a processor 22 in one possible embodiment. Speculative execution implemented according to the invention can provide performance improvement in a variety of CPU designs, including in particular, CPUs with multiple functional units or CPUs with multiple pipelined functional units. Speculative execution is particularly effective in enhancing performance in Very Long Instruction Word (VLIW) computers.

In the process of running a program, the CPU 22 carries out a series of instructions stored in memory 24. The instruction unit 34 fetches an instruction from memory via the system bus 28 and then decodes the instruction. Depending on the type of CPU and/or the scheduling method used, an instruction may have more than one operation. The instruction unit 34 issues operations to a functional unit 30 or to multiple functional units (shown as stacked boxes in FIG. 2). The instruction unit 34 sends control signals to a functional unit 30 to carry out the operation or operations in an instruction. In response to these control signals, the functional unit 30 reads data such as address or value from the appropriate registers in the register file 32 and performs an operation. For some operations, the functional unit 30 writes a result back to the register file 32. For a memory store operation, the functional unit 30 reads a memory address and a value stored in the register file 32 and transfers the value directly to memory 24.

While the specific structure of the processor can vary, the invention provides support for speculative execution in processors that use predicates to control the execution of operations.

In one embodiment of the invention, a speculative look aside table (SLAT) is used to support speculative execution. A label, added to an entry in the predicate register file, serves as an index to the SLAT. The SLAT stores state information used to defer exceptions generated by speculative operations. In one specific implementation, the SLAT has one fewer entry than the number of values that the label can represent because the value of zero is used to represent a non-speculative operation. The label, therefore, indicates whether or not an operation is speculative in addition to serving as an index into the SLAT. No additional op code bits are necessary to identify an operation as speculative.

For the purposes of illustration, we describe an implementation of the invention in a processor having five stages: fetch the next operation (F), decode the operation (D), read all registers (R), execute the operation (E), and write the targets (W).

Figure 3:
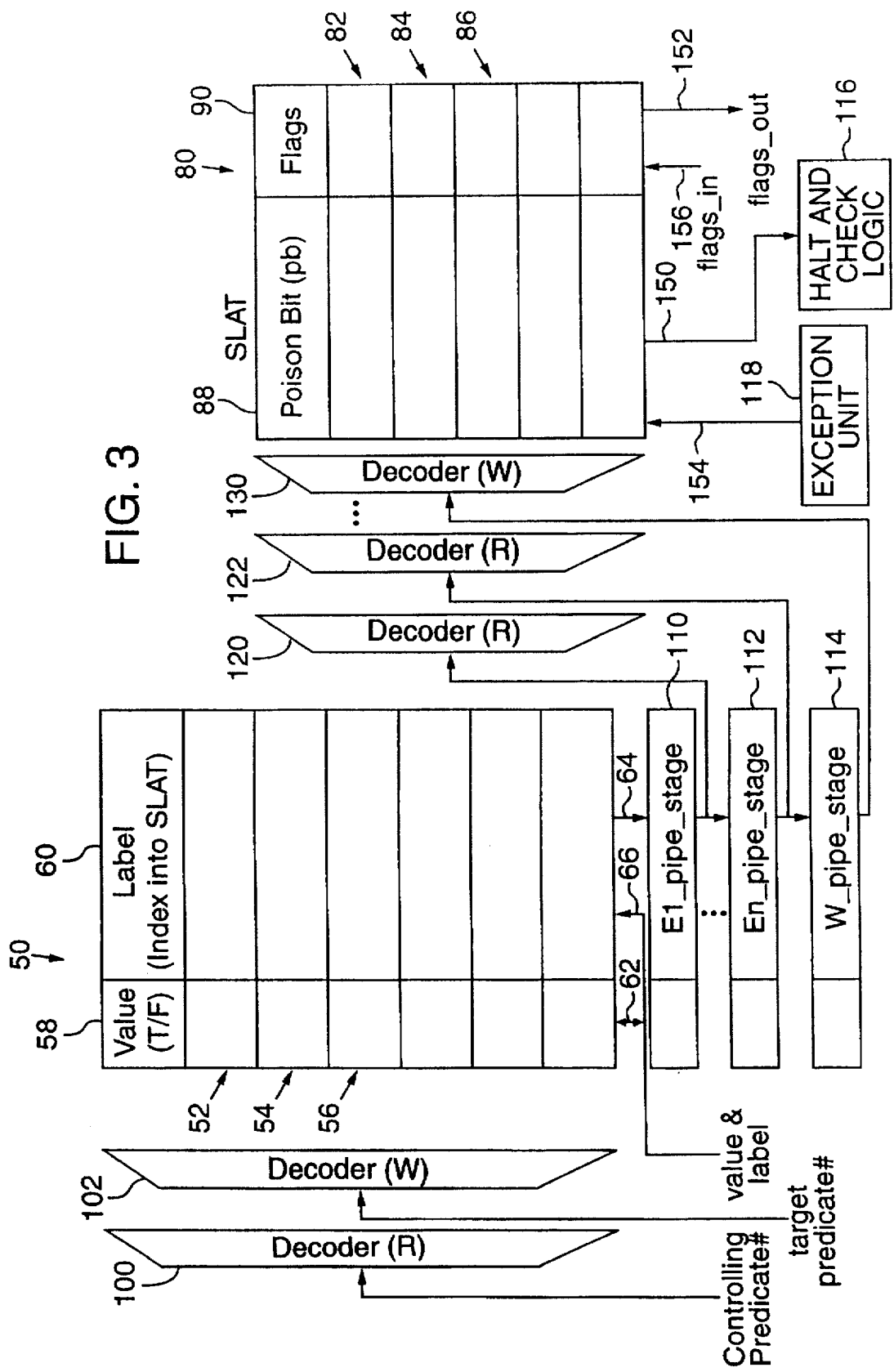
FIG. 3 is a block diagram illustrating a speculative look aside table and accompanying logic to support speculative execution in a processor.

FIG. 3 is a block diagram illustrating the logic in a processor used to support speculative execution. In this implementation, the memory for storing predicates in the processor is referred to as the predicate file. The predicate file 50 includes a series of entries (52, 54, 56, for example) for storing a predicate value 58 and a label 60. The predicate value 58 (either true or false) indicates whether an operation associated with it should be executed. The label 60 serves as an index to a speculative look aside table and also indicates whether an operation associated with it is speculative. A label of zero, in this implementation, indicates that the operation is non-speculative, while a non-zero label serves as an index to the SLAT.

The functional unit of the processor reads and writes predicate values through read ports (62 and 64 for example) and write ports (62 and 66) to the predicate file 50. When a predicate is the qualifying or controlling predicate for an operation, the functional unit reads the predicate value through read port 62 and the label through read port 64. Conversely when a predicate is a target of an operation, the functional unit writes labels to entries in the predicate file through the write port 66 of the predicate file 50. This diagram only provides one possible implementation of the predicate file; the specific structure and number of read and write ports can vary.

The SLAT 80 includes a number of entries (82, 84, and 86 for example) for storing exception data. In this particular implementation, each entry has at least one bit for storing a poison bit. When the poison bit is set, it indicates that an exception has been deferred for at least one of the operations corresponding to the SLAT entry. The SLAT 80 shown in FIG. 3 also includes a field or fields (90, for example) for storing additional flags. These flags can be used to store data for processing exceptions. For example, the SLAT entry can include a field for storing status bits used to process exceptions for IEEE floating point operations. The SLAT entry can also store the memory location of recovery code used in the recovery process for certain types of exceptions.

The logic of the processor shown in FIG. 3 includes predicate decoders 100, 102 used to control access to the predicate file 50. In this particular implementation, the logic includes at least a first predicate decoder 100 for decoding a controlling predicate for an operation. The logic also includes at least a second predicate decoder 102 for decoding target predicates when predicate values and labels are written to the predicate file. The first predicated decoder 100 is identified with an "R" in parentheses to illustrate that it is used to read an entry in the predicate file. The second predicate decoder 102 is identified with a "W" in parentheses to show that it is used to write data to one or more entries in the predicate file.

As introduced above, the functional unit of the processor can read labels from the predicate file 50 through read ports 64 as shown in FIG. 3. In this particular implementation, the functional unit includes a number of control units (110, 112, for example) that form part of the execute stage of the processor. These control units include control logic to read a label from an entry in the predicate file and submit the label to one of a series of label decoders (120, 122, for example) used to read a SLAT entry. As shown in FIG. 3, the control units used to execute operations in the processor can send a label to a corresponding label decoder for the SLAT.

In one embodiment, the functional unit reads a SLAT entry to determine whether a poison bit is set. One reason to read the SLAT entry is to determine whether execution of an operation should be halted. For example, if an exception has already been deferred for a speculative chain of operations, additional operations that correspond to the same SLAT entry need not be executed. Another reason is to check whether an exception has been deferred during an explicit or implicit check operation. The logic for reading the SLAT entry is illustrated as halt and check logic 116 in FIG. 3. While shown as one block in FIG. 3, the logic for halting execution of an operation, and the logic for checking a SLAT to determine whether an exception has been deferred can be implemented separately. The operation of this logic is described in further detail below.

The functional unit also includes control logic to write data to an entry in the SLAT. As shown in FIG. 3, the functional unit includes at least one control unit 114 that writes the results of an operation during the write stage of the processor. If an exception is generated for a speculative operation, the control unit updates the corresponding entry in the SLAT. In one implementation, an exception unit 118 sets a poison bit in a corresponding SLAT entry when an exception is generated for a speculative operation. As explained further below, the functional unit also writes to a SLAT entry to initialize it during an operation where a label is attached to a predicate.

The logic shown in FIG. 3 includes a series of label decoders (120, 122, 130, for example) that control access to the SLAT. To read data from a SLAT entry, the control logic (110 or 112, for example) in the functional unit issues control signals to the label decoders. Specifically in this embodiment, the control logic submits a label to the label decoders (120 or 122), which in turn, decode the label and allow the functional unit to read the contents of the corresponding SLAT entry. To write to a SLAT entry, the functional unit (114, for example) sends a SLAT label to a label decoder 130 used to set or clear a bit or bits in a SLAT entry. The exception unit 118 then writes data to the SLAT to update a poison bit, for example.

The SLAT includes read ports 150, 152 and write ports 154, 156 to allow the functional unit to read and write data to a SLAT entry. The number of ports can vary depending on the implementation. The SLAT shown in FIG. 3 has a read port 150 and write port 154 to set and clear a poison bit in a SLAT entry. The write port 154 is used to set the poison bit in a SLAT entry when a speculative operation generates an exception and to clear the poison bit when the SLAT entry is initialized. The read port 154 is used to determine whether an exception has been deferred. For example, in one implementation the processor checks the poison bit during the execution phase to determine whether to proceed in executing the current operation. As another example, the processor checks the poison bit in response to an explicit check operation to determine whether an exception has been deferred.

The SLAT can include additional read and write ports 152, 156 to read and write additional data in implementations where the size of the SLAT entry is larger than one bit. As noted above, the SLAT entry can store data in addition to a poison bit such as status bits used to control re-execution of operations.

To take advantage of the support for speculative execution in the processor, code executed in the processor is first optimized using speculative code motion. Speculative code motion can be performed by a compiler, manually by the assembly language programmer, by the processor hardware, or by some combination of these methods.

To support speculative execution using the SLAT, two operations are added on a trace: label predicate operation (lblpred) and a check label operation (chklbl). The label operation is inserted in the target basic block at the beginning of a chain of speculative operations. The purpose of the label operations is to attach a label to a predicate. The check label operation is inserted in the home basic block, and its purpose is to check whether an exception has been deferred for any of the speculative operations in the chain.

An example will help illustrate how these operations are scheduled. Consider the following source code:

```
a = *x;
if ( a == 0 ) {
    b = *y;
    c = *z;
    if ( b == 0 )
        d = *v;
    else
        e = *w;
}
```

One possible version of the assembly code for this example is:

1. p1?ld r7=r9
2. p1?cmpeq.u p4,p0=r7,0
3. p4?ld r2=(r10)
4. p4?ld r3=(r11)
5. p4?cmpeq.u p2,p3=r2,0
6. p2?ld r4=(r12)
7. p3?ld r5=(r13)

In this example, the "p_?" represents the qualifying predicate for the operation. The value of this predicate determines whether the operation will be executed. The notation, "r_", refers to a register in the register file. The notation, "ld," refers to a load operation, while the notation, "cmpeq.u," refers to a compare operation. In a compare operation such as "p4?cmpeq.u p2,p3=r2,0", the targets of the operation are predicates (p2 and p3 in this example).

A speculative version of this code for a processor with a SLAT is as follows:

1. p1?ld r7=r9
2. p1?lblpred,11 p4
3. p4?ld r2=(r10)
4. p4?ld r3=(r11)
5. p4?cmpeq.u p2,p3=r2,0
6. p2?ld r4=(r12)
7. p3?ld r5=(r13)
8. p1?cmpeq p5,p0=r7,0
9. p5?chklbl,11,immed p4

As shown in this example, only two additional operations are needed to speculate a chain of operations. This example also illustrates an added benefit of this approach: Speculative versions of the operations are not necessary because the label attached to the predicate indicates whether an operation is speculative.

The label predicate operation in this case has the form:

pb?lblpred,L pn where:

pb is the qualifying predicate of the target block, which is pi in this example.

L is an n-bit label used to associate the operations in the chain with a SLAT entry.

pn is the target predicate. The target predicate (p4 in this example) is set to the value of the qualifying predicate and gets the label "L".

When a label predicate operation is inserted, its qualifying predicate is the qualifying predicate of the target block. The target block refers to the basic block where an operation or chain of operations is moved using speculative code motion. The operands of the label predicate operation are the N bit label (L) and the target predicate (pn).

FIG. 4 is a flow diagram illustrating the steps executed by the processor to perform a label predicate operation. For clarity, the steps of the flow diagram appear in parentheses with the accompanying description in the text below. First, the predicate decoder decodes the qualifying predicate in the decode stage (180).

Next during the read stage, the functional unit reads the predicate value and label from the predicate file (182). For the purposes of illustration, we assume that the qualifying predicate for the label predicate operation is true in this example. If it is not, the labelling process halts and the processor moves to the next operation.

During the execute stage, the new label is initialized for the chain of speculative operations (184). In this case, this entails setting the corresponding entry in the SLAT to zero.

Next, the target predicate is decoded and the value of the qualifying predicate is copied to the target predicate (186). The label is written to the label field of the target predicate.

By attaching a label to a predicate in this manner, this method obviates the need to tag the operation itself. As a result, no op code bits are needed for the label. Rather, the op code bits already made available for predicates are used to store the indices to the SLAT.

The check operation in this example has the following format:

pq?chklbl,L,d pn where:

pq is the qualifying predicate of the home block of the speculated code. In this example, p5 is the qualifying predicate.

L is the label being checked, which is 11 in our example.

d is the program counter (PC) displacement to the fix-up code.

pn is the predicate specified in the label predicate operation, which is p4 in this example.

The check operation is inserted in the home block of a speculative operation or sequence of operations to check whether an exception has been deferred. During a check operation, the processor reads the SLAT entry corresponding to the label. If the poison bit is set, the processor either reports the exception or takes steps to recover from the execution. To recover from an exception, the processor uses the PC displacement value to jump to the appropriate fix-up code.

In one alternative implementation of the SLAT, the need for an explicit check operation can be avoided. In this implementation, the label operation encodes the location of the starting point of the recovery code in the corresponding SLAT entry. Certain non-speculative operations in the instructions set, such as a memory store for example, are then used to check for deferred exceptions. For instance, a non-speculative operation located in the home basic block can make an implicit check for a deferred exception, rather than explicit check described above. When such a non-speculative operation is executed under the control of a predicate with a non-zero label, an exception is generated if the poison bit is not zero. An exception handler then uses the address field in the corresponding SLAT entry to locate the recovery code.

Before describing the check operation in more detail, we first describe how the SLAT can be used to defer exceptions for speculative operations.

Figure 5:
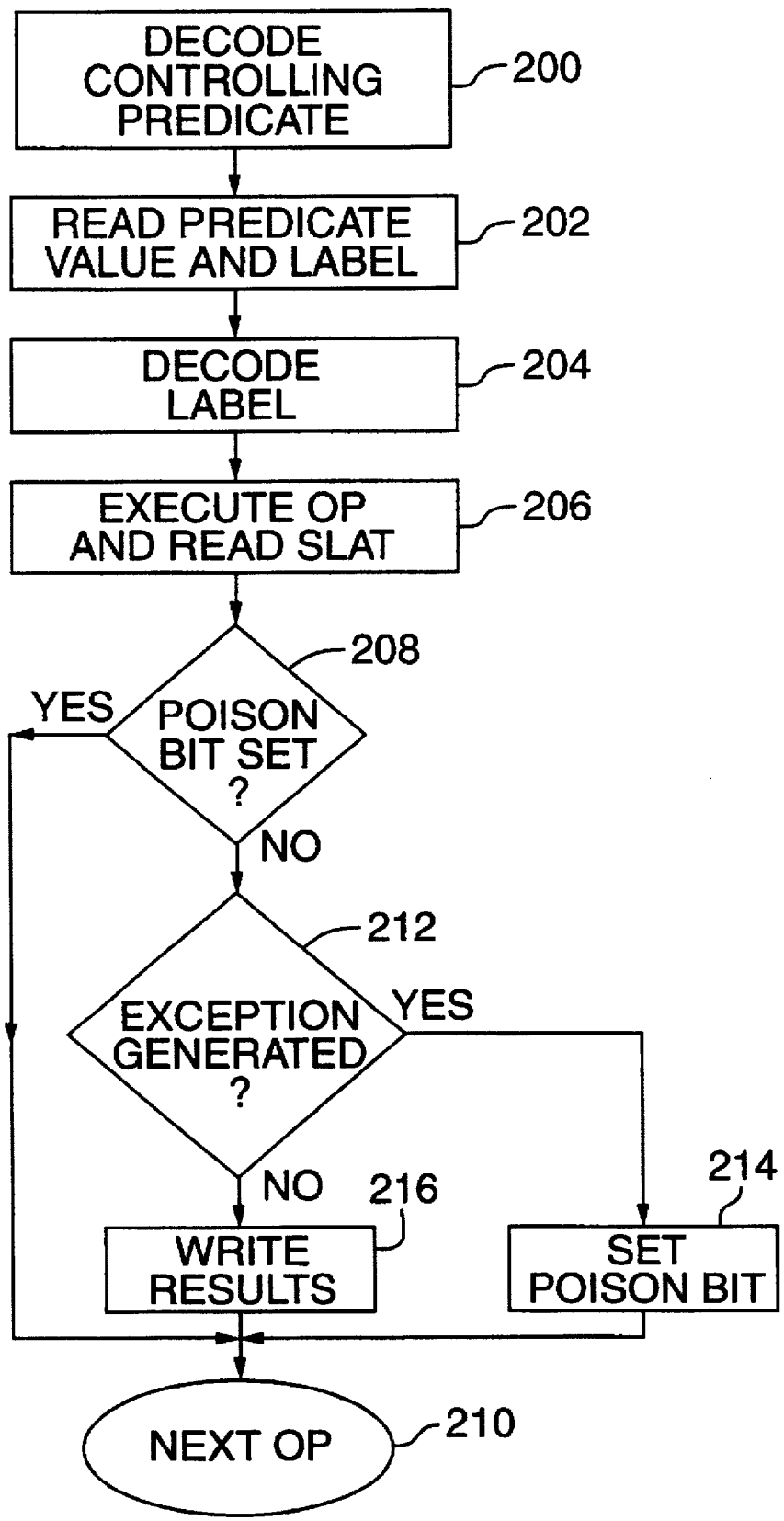
FIG. 5 is a flow diagram illustrating a process for deferring exceptions using a speculative look aside table in an embodiment of the invention.

FIG. 5 is a flow diagram illustrating a process for deferring exceptions using a SLAT. Assuming a pipelined processor with 5 stages as set forth above, the processor begins by fetching the next operation. During the decode stage, the processor inserts the number of the controlling predicate for the operation into the predicate decoder 100, and the predicate decoder locates the corresponding entry in the predicate file (200).

During the read stage, the functional unit (110, for example) reads the 1 bit predicate value and the n bit label from the predicate file (202). If the value of the predicate is zero, then the operation does not have to be executed. For this example, we assume that the predicate is true. It should be noted that the execution of the operation can be halted at any point before the write stage, the stage at which the operation can change the state of the processor. In some cases for example, the value of the predicate may not be known until later because it is being computed as the current operation proceeds through the pipeline process. In these circumstances, the execution of the processor may be halted at a later stage if the predicate turns out to be false.

In addition to reading the value of the predicate, the processor also reads the label. Since a label of zero identifies a non-speculative operation, the processor knows at this stage whether the operation is speculative. For the purpose of illustration, we assume that the operation is speculative in the example shown in FIG. 5. If it is not, this simply means that an exception, if generated, will be handled immediately rather than deferred.

During the execute stage, control logic 110 in the functional unit feeds the label to a label decoder 120, which then decodes the label (204). As the operation is executed, the processor reads the SLAT entry (206). If the poison bit is set, the processor can turn off any multi-cycle operation and skip to the next operation (208, 210).

If an exception is generated for a speculative operation (212), the processor writes data to the corresponding entry in the SLAT to indicate that an exception is being deferred. In this implementation, the exception unit 118 sets the poison bit (214). If the SLAT entries are wider than one bit, then additional data such as status bits or the address of fix-up code can be written to the SLAT entry.

For a floating point exception, for example, the processor could write IEEE mandated sticky bits to the indicated SLAT entry. To support this feature, additional ports are added to the SLAT and another operation is used to set these bits in the appropriate SLAT entry. Upon detection of a deferred exception, the check predicate operation transfers them into a Floating Point Status Register. Specifically, the check operation ORs these bits into the Floating Point Status Register. The label predicate operation clears these bits when it initializes a SLAT entry.

In the implementation shown in FIG. 3, the processor sets the poison bit during the write stage when an exception has been detected. The control logic in the write stage 114 feeds the label to the label decoder 130, which in turn locates the proper SLAT entry.

If an exception is not generated (212), the processor writes the results of the operation to the appropriate result register (216) and proceeds to the next operation.

FIG. 5 specifically illustrates how the SLAT is updated when an exception has been generated. To support speculative execution with the SLAT, the processor also has to propagate knowledge that an exception has occurred. An exception is propagated when the label for the SLAT entry holding a poison bit is copied to another predicate. For instance, an exception can be propagated when a predicate is the target of an operation such as a compare operation. The value of the target predicate is defined by the result of the operation. In addition, the label of the qualifying predicate is copied to the label of the target predicate.

In one specific embodiment, all of the predicates are set to true and all of the labels are set to zero before a program is started. To implement this approach, one predicate, p0 for example, is permanently true with a label of 0.

FIG. 6 is a flow diagram illustrating how knowledge of an exception can be propagated. The process begins in a similar fashion to the process illustrated in FIG. 5. The predicate decoder 100 (FIG. 3) decodes the controlling predicate (220) during the decode phase, and the control logic associated with the operation reads the predicate value and label during the read stage (222). During the execute stage, the processor computes the results of the operation (224).

The processor then writes the results of the operation to the predicate target or targets (226) during the write stage. In this implementation, the predicate decoder 102 decodes the number for the target predicate or predicates, and the processor writes the predicate value and label to the appropriate entries.

In addition to generating and propagating exception data, the processor also has a means to detect deferred exceptions. As introduced above, one way to detect a deferred exception is to insert an explicit check operation in the home basic block. Another way is to use an implicit check operation in the home basic block, such as the non-speculative operation (memory store) described above.

Another aspect of the support for speculative execution using the SLAT is how the processor performs recovery. Recovery is the process for re-executing operations when a recoverable exception is detected in response to an explicit or implicit check operation. When the processor completes re-execution of operations in the recovery process, it then resumes normal execution. Below, we describe the process of recovery and resumption in more detail.

Figure 7A:
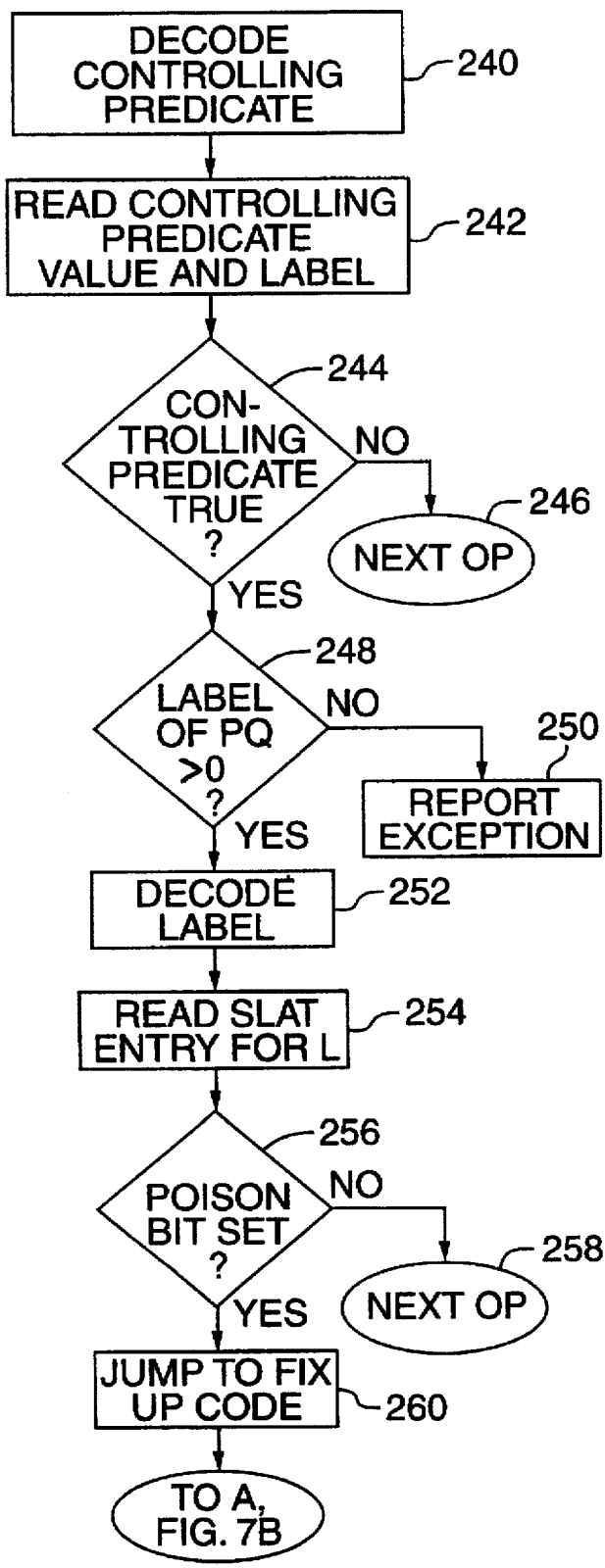
FIGS. 7A and 7B are a flow diagram illustrating steps in the process of checking for and recovering from deferred exceptions in an embodiment of the invention.
Figure 7B:
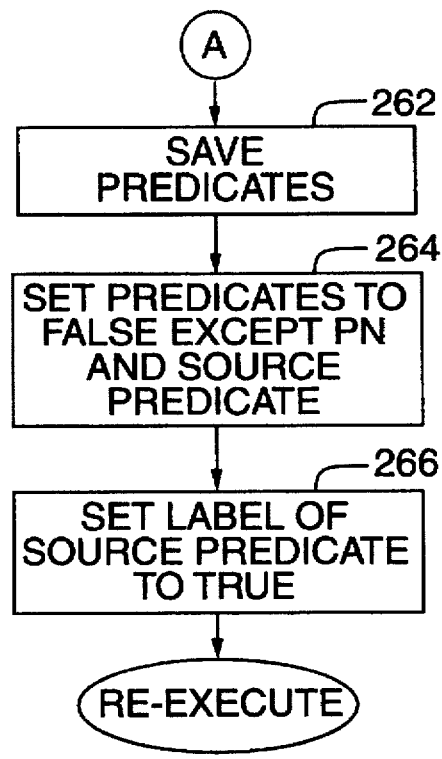

FIGS. 7A and 7B are a flow diagram illustrating steps for checking for and recovering from a deferred exception. This example refers to the case where an explicit check operation is used to check for a deferred exception. At the decode stage, the predicate decoder decodes the label for the controlling predicate (also referred to as the qualifying predicate, pq) of the check operation (240). During the read stage, the processor reads the controlling predicate value and label (242). If the controlling predicate value is not true (244), the rest of the check operation is skipped and the processor proceeds to the next operation.

If the controlling predicate value is true and the controlling predicate's label is non-zero (248), the processor reports a non-recoverable check exception (250).

If the controlling predicate value is true and the controlling predicate's label is zero (248), the processor decodes the label (L) specified in the check operation (252) and reads the corresponding SLAT entry (254).

If the poison bit is not set (256), the processor proceeds to the next operation (258). When the poison bit is not set, no exceptions have been deferred for the speculative operations associated with the SLAT entry. As such, there are no exceptions to handle and processing proceeds with the next operation.

If the poison bit is set, the processor handles the exception. This can entail reporting the exception, if the exception is non-recoverable, or re-executing operations, if the exception is recoverable. FIGS. 7A and 7B illustrate the specific case where the exception is recoverable.

In one implementation of the recovery process, the processor jumps to fix-up code based on the displacement value (d) specified in the explicit check operation (260). The processor takes a recovery fault to generic code that:

1) saves all predicates (and possibly branch triggers) (262);

2) sets all predicates to false except for the target predicate specified in the check operation (generally pn, and specifically p4 in the example above) and the source predicate (p1, in the example above) (264); and 3) sets the label of the source predicate to 0 (266).

As an additional step, the recovery process can also include clearing the poison bit of the SLAT. However, this can also be performed by the label predicate operation when it initializes a SLAT entry.

At the end of the recovery process, the processor executes a series of steps to resume normal operation. In the process of resumption, the state of the processor is reset so that subsequent operations execute normally. In one embodiment, the process of resumption is triggered in response to a check operation. Specifically, resumption occurs in response to a check operation where:

1) the value of the qualifying predicate is true;

2) the label of the qualifying predicate is zero; and 3) the label of the source predicate is zero.

When these conditions are met during recovery, the processor branches to generic code that restores the predicates (and possibly branch triggers), and resumes at the faulting check operation.

In the method described above, an explicit operation is not necessary to clear the state of the label. When a predicate is a target of an operation, the label field of the target predicate is automatically reset. As noted above, the label predicate operation takes care of resetting the corresponding SLAT entry to zero.

While we have described our invention with reference to specific embodiments, we do not intend to limit the scope of our invention to these embodiments. The SLAT and accompanying logic can implemented in a variety of ways. For example, the specific design of control logic used to read and write predicate data from the predicate file can vary. In addition, the control logic for reading and writing to SLAT entries can also vary. The size of the SLAT table and the format of the data stored in it can also vary.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

We claim:

1. In a processor, logic for supporting speculative execution comprising:

a speculative look aside table including a plurality of entries for storing data indicating whether an exception is being deferred;

a predicate register file including a plurality of entries operable to store a predicate for controlling execution of one or more operations and a label representing an index into the speculative look aside table;

a predicate decoder operable to read a predicate and to locate a corresponding entry in the predicate register file;

control logic operable to read a predicate value and a label from the corresponding entry in the predicate register file; and a label decoder communicative with the control logic, the label decoder operable to receive the label from the control logic and operable to locate a corresponding entry in the speculative look aside table.

2. The logic of claim 1 wherein the plurality of entries in the predicate register file include a first bit field for storing a 1 bit predicate, and an n-bit label for storing the index into the speculative look aside table, where n is an integer greater than or equal to two.

3. The logic of claim 1 wherein the processor includes a decode stage in which an operation is decoded, a read stage in which one or more operands of the operation are read, an execute stage in which the operation is executed, and a write stage in which a result of the operation is written to a target register; and wherein the predicate decoder is operable to control reading of the corresponding entry in the predicate register file at the read stage to determine whether the operation is speculative.

4. The logic of claim 1 wherein the processor includes a decode stage in which an operation is decoded, a read stage in which one or more operands of the operation are read, an execute stage in which the operation is executed, and a write stage in which a result of the operation is written to a target register;

wherein the control logic is operable to issue the label from the corresponding entry in the predicate register file to the label decoder during the execute stage; and wherein the logic includes halt logic operable to read the corresponding entry in the speculative look aside table during the execute stage, and operable to halt execution of the operation when a poison bit is set in the corresponding entry in the speculative look aside table.

5. The logic of claim 1 further including check logic communicative with the speculative look aside table, the check logic operable to read the corresponding entry in the speculative look aside table and operable to initiate recovery from an exception when a poison bit is set.

6. The logic of claim 1 further including a second label decoder, the second label decoder operable to control writing a poison bit to the corresponding entry in the speculative look aside table.

7. The logic of claim 6 wherein the processor includes a decode stage in which an operation is decoded, a read stage in which one or more operands of the operation are read, an execute stage in which the operation is executed, and a write stage in which a result of the operation is written to a target register; and wherein the second label decoder is operable to control writing the poison bit to the corresponding entry in the speculative look aside table during the write stage.

8. The logic of claim 1 further including a second predicate decoder operable to control writing of results of an operation on a predicate, including a label, to one or more entries in the predicate register file.

9. The logic of claim 8 wherein the processor includes a decode stage in which an operation is decoded, a read stage in which one or more operands of the operation are read, an execute stage in which the operation is executed, and a write stage in which a result of the operation is written to a target register; and wherein the second predicate decoder controls the writing of the results of the operation on the predicate during the write stage.

10. The logic of claim 1 wherein the processor includes a functional unit, and the functional unit has a label operator to attach a label to a predicate in the predicate register file.

11. The logic of claim 1 wherein the processor includes a functional unit, and the functional unit has check logic to determine whether an entry in the speculative look aside table corresponding to a specified label includes a poison bit.

12. The logic of claim 1 wherein the plurality of entries in the speculative look aside table include a field for storing a poison bit indicating whether an exception is being deferred.

13. The logic of claim 1 wherein the plurality of entries in the speculative look aside table include a field for storing one or more status bits used to control processing of a deferred exception.

14. The logic of claim 13 wherein the status bits include status bits to control the processing of a deferred exception for a floating point operation.

15. The logic of claim 13 wherein the plurality of entries in the speculative look aside table include an address field for storing a memory location of recovery code.

16. A method for supporting speculative execution using a speculative look aside table, the method comprising:

decoding a predicate for an operation;

reading the predicate and associated label;

controlling execution of the operation based on a value of the predicate;

decoding the label;

reading an entry in the speculative look aside table corresponding to the label to determine whether an exception has been deferred; and based on the entry in the speculative look aside table, controlling further execution of the operation.

17. The method of claim 16 further including:

reading the label to determine whether the operation is a speculative operation;

setting a poison bit in the entry of the speculative look aside table corresponding to the label when the operation is speculative and generates an exception.

18. The method of claim 16 further including:

decoding the operation to determine whether the operation has a predicate target;

computing results of the operation; and writing the results of the operation including the label to an entry in a predicate register file corresponding to the predicate target.

19. The method of claim 16 further including:

in an explicit check operation, determining whether the entry corresponding to a label specified in the explicit check operation is storing a flag indicating that an exception has been deferred; and when the flag is detected, branching to re-execution code including operations qualified with predicates having the label specified in the check operation.

20. In a processor having a decode stage in which an operation is decoded, a read stage in which one or more operands of the operation are read, an execute stage in which the operation is executed, and a write stage in which a result of the operation is written to a target register, logic for supporting speculative execution comprising:

a speculative look aside table including a plurality of entries for storing a poison bit indicating whether an exception is being deferred;

a predicate register file including a plurality of entries operable to store a predicate value for controlling execution of one or more operations and a label representing an index into the speculative look aside table;

a first predicate decoder operable to read a predicate and to locate a corresponding entry in the predicate file during the read stage of the processor;

a second predicate decoder operable to control writing of results of an operation on a predicate, including a label, to one or more entries in the predicate file;

control logic operable to read a predicate value and a label from the corresponding entry in the predicate file and to issue the label to a first label decoder;

the first label decoder communicative with the control logic to receive the label from the control logic, and operable to read a corresponding entry in the speculative look aside table; and a second label decoder communicative with the speculative look aside table, the second label decoder operable to control writing a poison bit to the corresponding entry in the speculative look aside table.

* * * * *